(12) United States Patent
Fujimoto et al.

(10) Patent No.: US 12,215,240 B2
(45) Date of Patent: Feb. 4, 2025

(54) AQUEOUS INK, INK CARTRIDGE AND INK JET RECORDING METHOD

(71) Applicant: CANON KABUSHIKI KAISHA, Tokyo (JP)

(72) Inventors: Kuniaki Fujimoto, Fukushima (JP); Yasuaki Murai, Tokyo (JP); Saki Tasaki, Kanagawa (JP); Hideki Yamakami, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 458 days.

(21) Appl. No.: 17/092,414

(22) Filed: Nov. 9, 2020

(65) Prior Publication Data

US 2021/0139723 A1    May 13, 2021

(30) Foreign Application Priority Data

Nov. 12, 2019 (JP) .................................. 2019-204528
Oct. 5, 2020 (JP) .................................. 2020-168316

(51) Int. Cl.
*C09D 11/328* (2014.01)
*B41J 2/175* (2006.01)
(Continued)

(52) U.S. Cl.
CPC .......... *C09D 11/328* (2013.01); *B41J 2/17503* (2013.01); *B41J 2/2107* (2013.01); *B41J 11/002* (2013.01); *B41M 5/388* (2013.01)

(58) Field of Classification Search
CPC ... C09D 11/328; B41J 2/17503; B41J 2/2107; B41J 11/002; B41J 2/1752; B41J 2/1753;
(Continued)

(56) References Cited

U.S. PATENT DOCUMENTS 7,083,667 B2    8/2006    Murai et al.
7,208,033 B2    4/2007    Kawabe et al.
(Continued)

FOREIGN PATENT DOCUMENTS

CN         1946810 A       4/2007
CN       103694740 A       4/2014
(Continued)

OTHER PUBLICATIONS

English Machine Translation of JP6024894B2 ("Machine_Translation_JP_6024894_B2") (Year: 2016).*
(Continued)

*Primary Examiner* — Jennifer A Smith
*Assistant Examiner* — Jeffrey Eugene Barzach
(74) *Attorney, Agent, or Firm* — Venable LLP

(57) ABSTRACT

Provided is an aqueous ink capable of recording an image having a good hue as a magenta ink. The aqueous ink is an aqueous ink for ink jet including a first coloring material and a second coloring material. The first coloring material is a compound represented by general formula (1), and the second coloring material is a compound represented by general formula (2). A proportion (% by mass) of a content
(Continued)

of the second coloring material to a total content of the first coloring material and the second coloring material in the aqueous ink is 0.60% by mass or more.

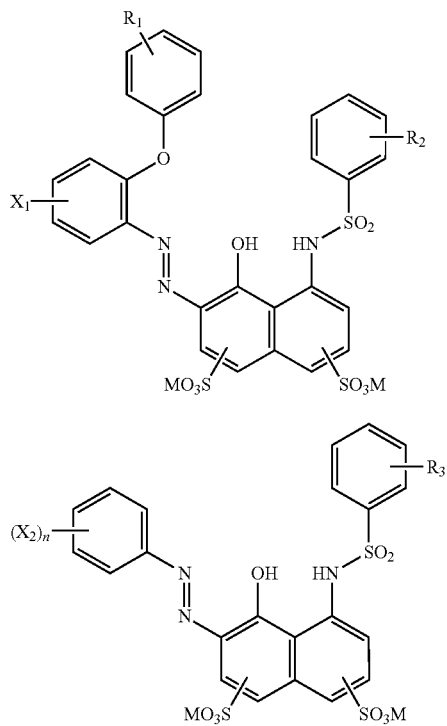

21 Claims, 2 Drawing Sheets

(51) Int. Cl.
*B41J 2/21* (2006.01)
*B41J 11/00* (2006.01)
*B41M 5/388* (2006.01)

(58) Field of Classification Search
CPC ... B41J 2/17553; B41J 2/17513; B41M 5/388
See application file for complete search history.

(56) References Cited

U.S. PATENT DOCUMENTS

| | | |
|---|---|---|
| 7,244,299 B2 | 7/2007 | Tsuji et al. |
| 7,285,159 B2 | 10/2007 | Aikawa et al. |
| 7,294,184 B2 | 11/2007 | Fujimoto et al. |
| 7,297,196 B2 | 11/2007 | Matsumoto et al. |
| 7,303,615 B2 | 12/2007 | Yamagishi et al. |
| 7,445,325 B2 | 11/2008 | Aikawa et al. |
| 7,503,965 B2 | 3/2009 | Matsui et al. |
| 7,504,488 B2 | 3/2009 | Toyoda et al. |
| 7,566,362 B2 | 7/2009 | Mori et al. |
| 7,594,719 B2 | 9/2009 | Tomioka et al. |
| 7,598,012 B2 | 10/2009 | Murai et al. |
| 7,618,484 B2 | 11/2009 | Fujimoto et al. |
| 7,648,943 B2 | 1/2010 | Fujiwara et al. |
| 7,682,433 B2 | 3/2010 | Yanagimachi et al. |
| 7,866,809 B2 | 1/2011 | Tomioka et al. |
| 7,988,277 B2 | 8/2011 | Moribe et al. |
| 8,029,612 B2 | 10/2011 | Ishii et al. |
| 8,070,871 B2 | 12/2011 | Kawabe et al. |
| 8,083,341 B2 | 12/2011 | Yamakami et al. |
| 8,123,846 B2 | 2/2012 | Yamakami et al. |
| 8,343,269 B2 | 1/2013 | Takahashi et al. |
| 8,814,341 B2 | 8/2014 | Nagao et al. |
| 9,540,532 B2 | 1/2017 | Double et al. |
| 10,259,960 B2 | 4/2019 | Fujimoto et al. |
| 10,280,323 B2 | 5/2019 | Fujimoto et al. |
| 2006/0009357 A1 | 1/2006 | Fujiwara et al. |
| 2007/0062413 A1 | 3/2007 | Matsumoto et al. |
| 2016/0297980 A1* | 10/2016 | Shinohara ............ C09B 35/46 |

FOREIGN PATENT DOCUMENTS

| | | |
|---|---|---|
| CN | 104769055 A | 7/2015 |
| CN | 108841204 A | 11/2018 |
| JP | S60-81266 A | 5/1985 |
| JP | 2006-143989 A | 6/2006 |
| JP | 6024894 B2 * | 11/2016 |
| JP | 2016-199618 A | 12/2016 |
| WO | 2004/104108 A1 | 12/2004 |

OTHER PUBLICATIONS

Jun. 2, 2022 Office Action in Chinese Patent Application No. 202011260755.7.

* cited by examiner

AQUEOUS INK, INK CARTRIDGE AND INK JET RECORDING METHOD

BACKGROUND OF THE INVENTION

Field of the Invention

The present invention relates to an aqueous ink, an ink cartridge and an ink jet recording method.

Description of the Related Art

A recorded matter obtained by an ink jet recording method has low image storability as compared with a silver salt photograph. That is, when the recorded matter is exposed to light, humidity, heat, environmental gas present in air for a long period of time, there is a problem that a coloring material (mainly a dye) of the recorded matter is deteriorated to easily cause change in color tone or fading of the image. However, in recent years, coloring materials (mainly dyes) have been highly functionalized and the image storability of the recorded matter has been improved to a level comparable to that of silver salt photographs. Particularly, the image storability of dyes (anthrapyridone dye and azo dye) exhibiting a hue in a magenta region are remarkably improved (refer to International Publication No. WO2004/104108 and Japanese Patent Application Laid-Open No. 2006-143989).

As a result of an investigation conducted by the present inventors, it has been found that the above-mentioned dyes have good image storability such as ozone resistance and light fastness, but there is room for improvement in the hue in the magenta region.

Therefore, an object of the present invention is to provide an aqueous ink capable of recording an image having a good hue as a magenta ink. Another object of the present invention is to provide an ink cartridge and an ink jet recording method using the aqueous ink.

SUMMARY OF THE INVENTION

The objects are achieved by the present invention described below. That is, according to the present invention, there is provided an aqueous ink for ink jet including a first coloring material and a second coloring material, in which the first coloring material is a compound represented by general formula (1), the second coloring material is a compound represented by general formula (2), and a proportion (% by mass) of a content of the second coloring material to a total content of the first coloring material and the second coloring material in the aqueous ink is 0.60% by mass or more.

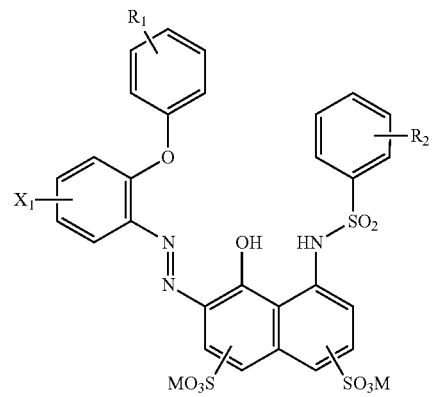

In general formula (1), $R_1$ and $R_2$ each independently represent a hydrogen atom, an alkyl group or an alkoxy group, $X_1$ represents a halogen atom, and M's each independently represent a hydrogen atom, an alkali metal, ammonium or organic ammonium.

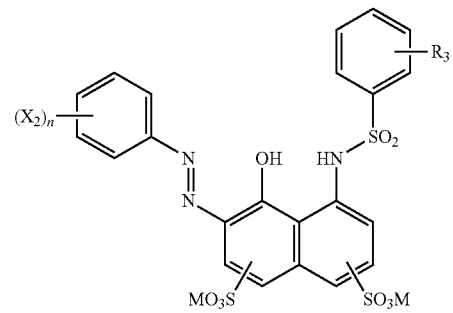

In general formula (2), $R_3$ represents a hydrogen atom, an alkyl group or an alkoxy group, $X_2$'s each independently represent a halogen atom, n represents an integer of 1 or 2, and M's each independently represent a hydrogen atom, an alkali metal, ammonium or organic ammonium.

According to the present invention, it is possible to provide an aqueous ink capable of recording an image having a good hue as a magenta ink. Further, according to the present invention, it is possible to provide an ink cartridge and an ink jet recording method using the aqueous ink.

Further features of the present disclosure will become apparent from the following description of exemplary embodiments with reference to the attached drawings.

DESCRIPTION OF THE EMBODIMENTS

Figure 1:
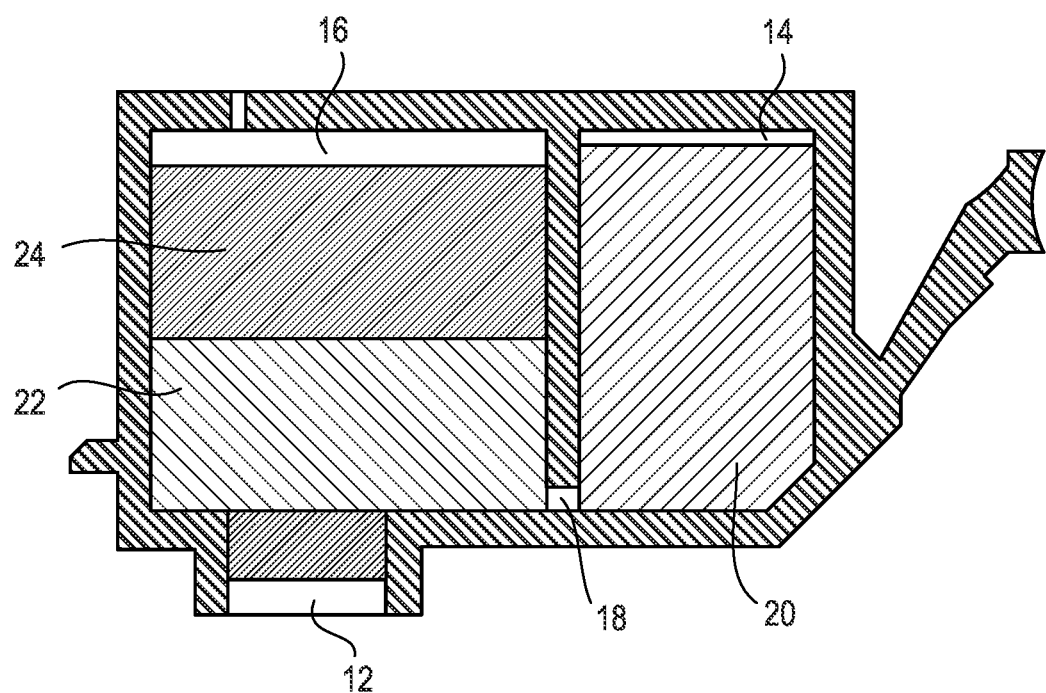
FIG. 1 is a sectional view schematically illustrating an exemplary embodiment of an ink cartridge according to the present invention.

The present invention will be described in more detail below with reference to preferred exemplary embodiments. In the present invention, in a case where a compound is a salt, the salt is present in an ink in a state of being dissociated into ions. However, this is referred to as "containing a salt" for the sake of convenience. In addition, an aqueous ink for ink jet may be simply referred to as "ink". The physical property values are values at normal temperature (25° C.) unless otherwise specified.

The present inventors have conducted a detailed investigation on an ink containing an anthrapyridone dye described in International Publication No. WO2004/104108 in an ink jet recording method for ejecting the ink from a recording head by the action of thermal energy. As a result, it has been found that although an image obtained using the ink has a hue in the magenta region, the hue is slightly bluish and is not suitable as the hue of the magenta ink. In addition, the present inventors have also conducted a detailed investigation on an azo dye described in Japanese Patent Application Laid-Open No. 2006-143989 in the same manner and have found that although an image obtained by the method has a hue in the magenta region, the hue is slightly yellowish and is also not suitable as the hue of the magenta ink.

As a result of further investigations, the present inventors have found that an image having a good hue as a magenta ink can be obtained by using the following aqueous ink. That is, an aqueous ink according to the present invention contains a first coloring material and a second coloring material. The first coloring material is a compound represented by general formula (1) described later. The second coloring material is a compound represented by general formula (2) described later. Then, it is required that a proportion (% by mass) of a content of the second coloring material to a total content of the first coloring material and the second coloring material in the aqueous ink is 0.60% by mass or more.

As a result of the investigations by the present inventors, the second coloring material has an absorption spectrum similar to the absorption spectrum of the first coloring material, and while the water solubility of the second coloring material is higher than that of the first coloring material, the solubility in a water-soluble organic solvent such as methanol is low. By using the first coloring material and the second coloring material in combination, a hue that is preferable for a magenta ink is obtained. This mechanism is presumed as follows. That is, when the ink is ejected from the recording head and ink droplets are formed, the surface area per unit mass dramatically increases, and thus water begins to evaporate to concentrate a water-soluble organic solvent. First, the second coloring material, which has a relatively low solubility in the water-soluble organic solvent, begins to aggregate. After that, when the ink droplets adhere to a recording medium, the second coloring material, which has begun to aggregate in advance, is fixed near the surface of the recording medium, and the first coloring material aggregates in the recording medium. It is considered that since the first coloring material and the second coloring material are fixed at positions close to each other in a thickness direction of the recording medium in this manner, color development efficiency is improved and an image having a preferable hue as a magenta ink can be recorded.

It is required that the proportion (% by mass) of the content of the second coloring material to the total content of the first coloring material and the second coloring material in the ink is 0.60% by mass or more. When the proportion is 0.60% by mass or more, an image having a preferable hue as a magenta ink can be recorded. The reason for this is presumed as follows. As described above, while the water solubility of the second coloring material is higher than that of the first coloring material, the solubility in the water-soluble organic solvent is low. Thus, when the proportion (% by mass) is 0.60% by mass or more, a larger amount of the second coloring material is fixed near the surface of the recording medium and thus an image having a preferable hue as a magenta ink can be recorded. On the other hand, when the proportion (% by mass) is less than 0.60% by mass, it is presumed that the second coloring material fixed near the surface of the recording medium is insufficient, and it is difficult to obtain a preferable hue as a magenta ink.

<Ink>

The aqueous ink according to the present invention contains a first coloring material and a second coloring material. The first coloring material is a compound represented by general formula (1). The second coloring material is a compound represented by general formula (2). The proportion (% by mass) of the content of the second coloring material to the total content of the first coloring material and the second coloring material in the aqueous ink is 0.60% by mass or more. The ink according to the present invention does not need to be an active energy ray curable type ink, and therefore does not need to contain a monomer having a polymerizable group. Hereinafter, components constituting the ink according to the present invention and physical properties of the ink will be described in detail.

(Coloring Material)

The ink according to the present invention contains a compound represented by general formula (1) as the first coloring material and a compound represented by general formula (2) as the second coloring material. These coloring materials are water-soluble dyes. A dye having a structure different from the structures of the first coloring material and the second coloring material may be used together for the purpose of color toning.

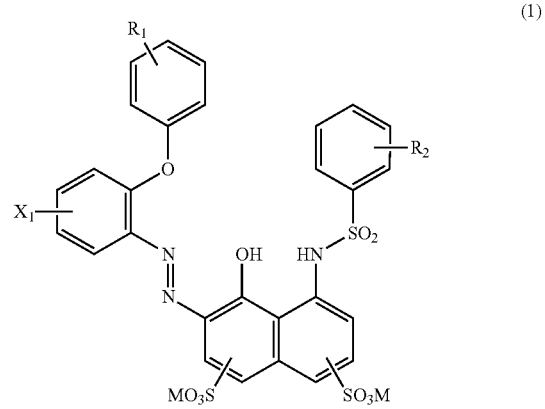

(1)

In general formula (1), $R_1$ and $R_2$ each independently represent a hydrogen atom, an alkyl group or an alkoxy group, $X_1$ represents a halogen atom, and M's each independently represent a hydrogen atom, an alkali metal, ammonium or organic ammonium.

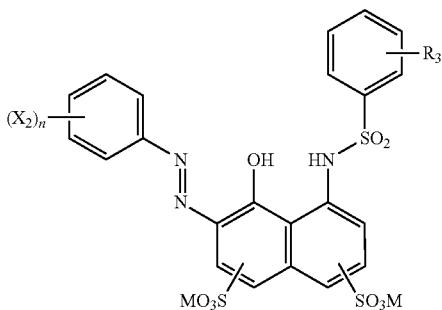

(2)

In general formula (2), $R_3$ represents a hydrogen atom, an alkyl group or an alkoxy group, $X_2$'s each independently represent a halogen atom, n represents an integer of 1 or 2, and M's each independently represent a hydrogen atom, an alkali metal, ammonium or organic ammonium.

Examples of the alkyl group represented by $R_1$ and $R_2$ in general formula (1) and $R_3$ in general formula (2) include linear or branched alkyl groups. The alkyl group preferably has 1 to 8 carbon atoms and more preferably 1 to 4 carbon atoms. Examples of such an alkyl group include linear alkyl groups such as a methyl group, an ethyl group, an n-propyl group and an n-butyl group; and branched alkyl groups such as an isopropyl group, an isobutyl group, a sec-butyl group and a tert-butyl group. Among these, a linear alkyl group is preferable, and a methyl group is more preferable.

Examples of the alkoxy group represented by $R_1$ and $R_2$ in general formula (1) and $R_3$ in general formula (2) include linear or branched alkoxy groups. The alkoxy group preferably has 1 to 8 carbon atoms and more preferably 1 to 4 carbon atoms. Examples of such an alkoxy group include linear alkoxy groups such as a methoxy group, an ethoxy group, an n-propoxy group and an n-butoxy group; and branched alkoxy groups such as an isopropoxy group, an isobutoxy group and a tert-butoxy group. Among these, a linear alkoxy group is preferable and a methoxy group is more preferable.

As the first coloring material, a compound in which $R_1$ in general formula (1) represents a hydrogen atom or a compound in which $R_2$ represents an alkyl group is preferable. In addition, as the second coloring material, a compound in which $R_3$ in general formula (2) represents an alkyl group is preferable. Further, regarding the combination of the first coloring material and the second coloring material, it is preferable that $R_2$ in general formula (1) and $R_3$ in general formula (2) are the same. Thus, an image which is more excellent in an ink ejection property and has a more preferable hue as a magenta ink can be recorded. From this point of view, $R_2$ in general formula (1) and $R_3$ in general formula (2) more preferably represent the same alkyl group, and both $R_2$ and $R_3$ still more preferably represent a methyl group.

Examples of the halogen atom represented by each of $X_1$ in general formula (1) and $X_2$ in general formula (2) include a fluorine atom, a chlorine atom, a bromine atom and an iodine atom. Among these, a chlorine atom is preferable.

Examples of the alkali metal represented by M in general formulae (1) and (2) include lithium, sodium and potassium. Similarly, examples of the organic ammonium represented by M include alkylammoniums such as methylammonium, dimethylammonium, trimethylammonium, tetramethylammonium, ethylammonium, n-propylammonium and n-butylammonium; and mono-, di- or trialkanolammoniums such as monoethanolammonium, diethanolammonium and triethanolammonium. Among these, sodium, potassium and ammonium are more preferable.

Suitable examples of the compound represented by general formula (1), which is the first coloring material and are expressed in a free acid form, include Compounds I-1 to I-6 each represented by formulae (I-1) to (I-6). Of course, in the present invention, the compound represented by general formula (1) is not limited to the compounds shown below as long as the compound is included in the structure of general formula (1) and the definition thereof. In the present invention, Compound I-1 (C.I. Acid Red 249) is preferable among the compounds shown below in a free acid form. As the first coloring material, sodium salt type Compound I-1 (a compound in which "SO$_3$H" in formula (I-1) is "SO$_3$Na") is more preferable.

Compound I-1

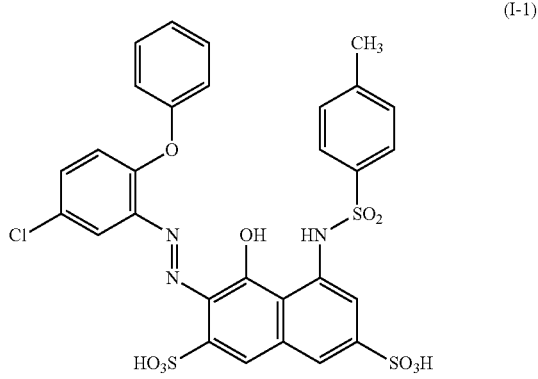

(I-1)

Compound I-2

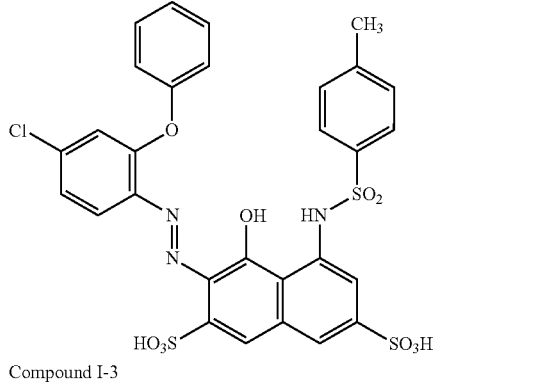

(I-2)

Compound I-3

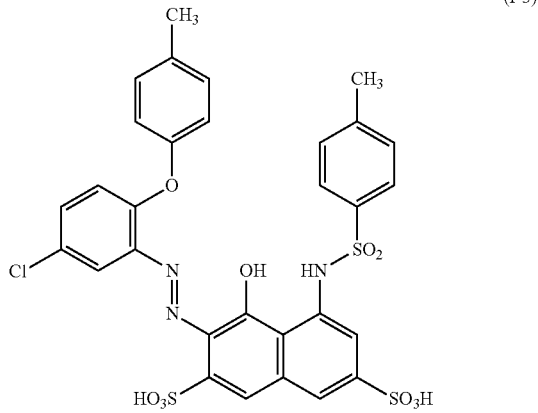

(I-3)

Compound I-4

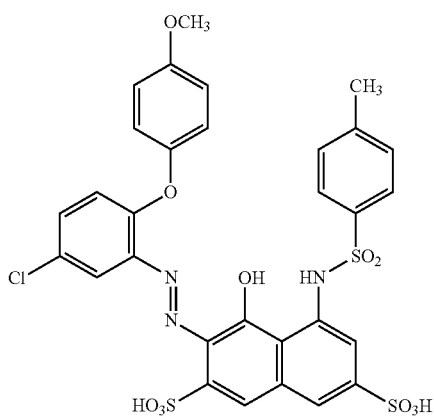

(I-4)

Compound I-5

(I-5)

Compound I-6

(I-6)

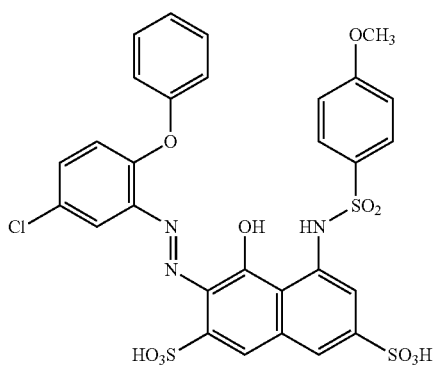

As the second coloring material, a compound represented by general formula (2.1) and a compound represented by general formula (2.2) are preferable since a more preferable hue as a magenta ink can be exhibited. M in general formula (2.1) and general formula (2.2) have the same meaning as M in general formula (2).

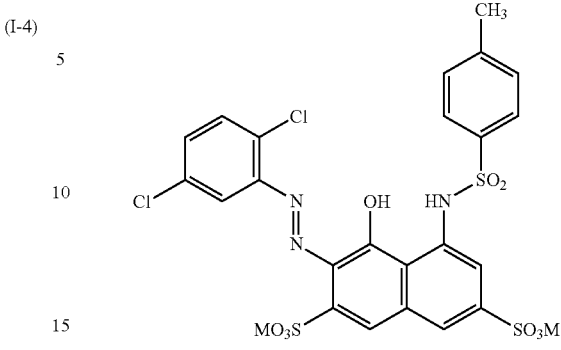

(2.1)

(2.2)

Suitable examples of the compound represented by general formula (2), which is the second coloring material and expressed in a free acid form, include Compounds II-1 to II-6 each represented by formulae (II-1) to (II-6). Of course, in the present invention, the compound represented by general formula (2) is not limited to the compounds shown below as long as the compound is included in the structure of general formula (2) and the definition thereof. In the present invention, among the compounds shown below in a free acid form, Compound II-1 included in the compound represented by general formula (2.1) or Compound II-5 included in the compound represented by general formula (2.2) described above are preferable.

Compound II-1

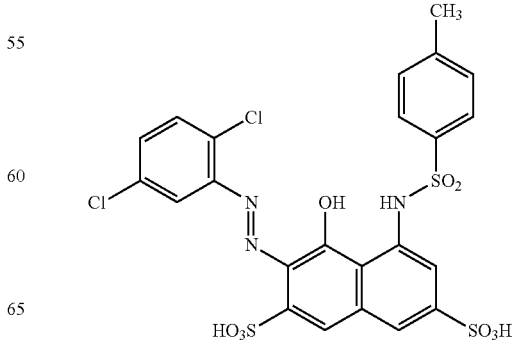

(II-1)

-continued

Compound II-2

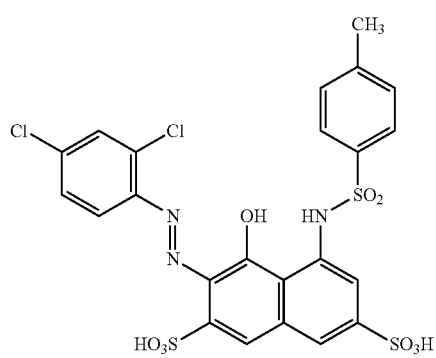
(II-2)

Compound II-3

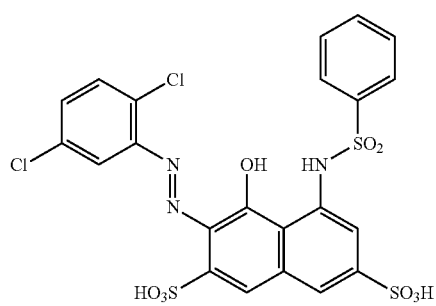
(II-3)

Compound II-4

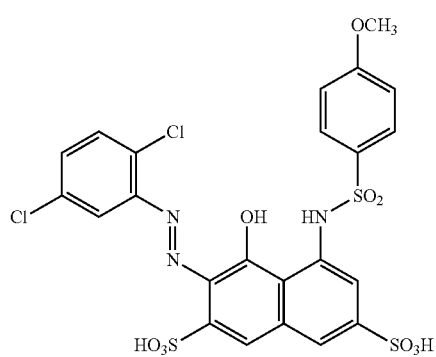
(II-4)

Compound II-5

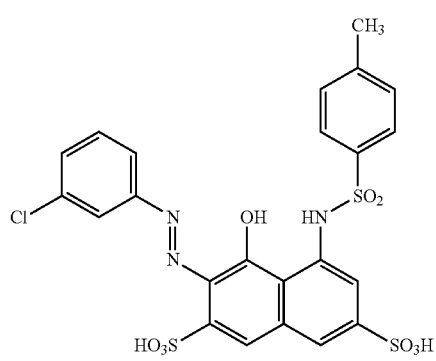
(II-5)

-continued

Compound II-6

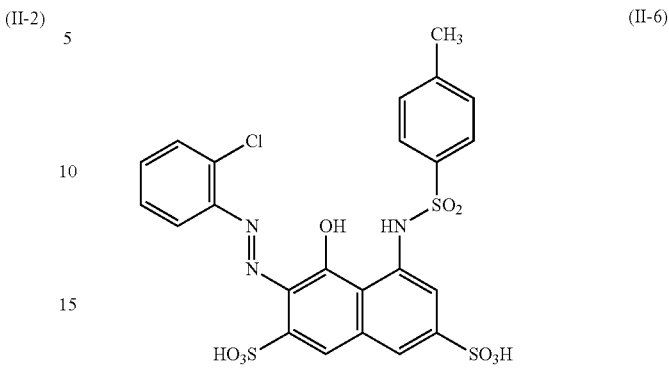
(II-6)

The compound represented by general formula (1), which is the first coloring material, can be synthesized by, for example, the method described below. $R_2$ in general formulae (b) and (c) and $R_1$ and $X_1$ in general formula (d), which are mentioned in the following description of the synthesis method, have the same meaning as those in general formula (1). $X_3$ in general formula (b) represents a halogen atom (for example, a fluorine atom, a chlorine atom, a bromine atom, and an iodine atom).

A compound represented by general formula (a) is allowed to react with a compound represented by general formula (b) to obtain a compound (intermediate) represented by general formula (c). For example, an aqueous solution containing the compound represented by general formula (a) is heated, the pH of the solution is adjusted to about 2 to 4 and the compound represented by general formula (b) is added to the solution in the state. Then, after the mixture is allowed to react for a predetermined period of time, the pH is adjusted to about 5 to 7 and the resultant is allowed to react. After the reaction, the pH of the reaction liquid is adjusted to about 1 and the precipitated insoluble matter is separated by filtration to obtain the compound (intermediate) represented by general formula (c).

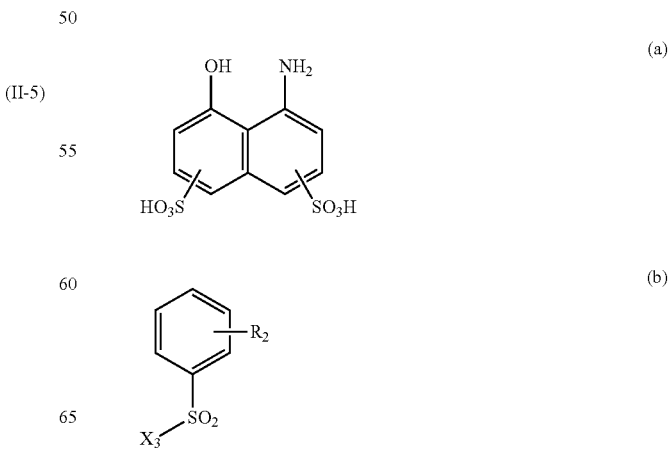
(a)

(b)

(c)

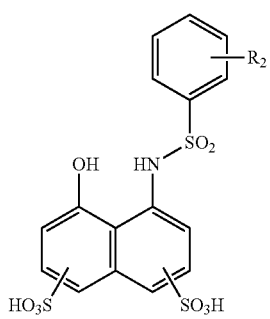

Next, a diazo compound obtained by diazotizing a compound represented by general formula (d) according to an ordinary method and the compound (intermediate) represented by general formula (c) obtained as described above are subjected to a coupling reaction according to an ordinary method. Thus, the compound (first coloring material) represented by general formula (1) (M in the formula represents a hydrogen atom) in a free acid form can be obtained.

(d)

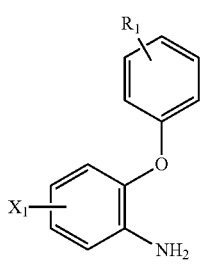

The diazotization of the compound represented by general formula (d) can be carried out by, for example, adding a diazotizing agent to the solution of the compound under the conditions at a liquid temperature of about −50 to 100° C. (preferably −10 to 10° C.) in the presence of an inorganic acid such as hydrochloric acid or sulfuric acid. As the diazotizing agent, for example, nitrosylsulfuric acid; nitrites of alkali metals such as sodium nitrite and potassium nitrite can be used. The coupling reaction between the diazo compound of the compound represented by general formula (d) and the compound represented by general formula (c) can be carried out, for example, in a liquid medium at a temperature of about −50 to 100° C. (preferably −10 to 10° C.) and at a weakly acidic to alkaline pH value. Water, an organic solvent, or a mixture thereof can be used as the liquid medium. The pH value is preferably a weakly acidic to alkaline pH value. For example, the coupling reaction can be carried out at pH 5 to 10 and the pH value can be adjusted by adding a base. As the base, for example, alkali metal hydroxides such as lithium hydroxide and sodium hydroxide; alkali metal carbonates such as lithium carbonate, sodium carbonate and potassium carbonate; alkali metal acetates such as sodium acetate; ammonia; and organic amines can be used. The compound represented by general formula (c) and the compound represented by general formula (d) may be used in approximately stoichiometric amounts.

On the other hand, the compound represented by general formula (2), which is the second coloring material, can be synthesized, for example, by the method described below. $R_3$, $X_2$ and n in general formulae (e) to (g) described in the following description of the synthesis method have the same meaning as those in general formula (2). Further, $X_4$ in general formula (e) represents a halogen atom (for example, a fluorine atom, a chlorine atom, a bromine atom, and an iodine atom).

The compound represented by general formula (a) is allowed to react with the compound represented by general formula (e) to obtain a compound (intermediate) represented by general formula (f). For example, an aqueous solution containing the compound represented by general formula (a) is heated, the pH of the solution is adjusted to about 2 to 4 and the compound represented by general formula (e) is added to the solution in the state. Then, after the mixture is allowed to react for predetermined period of time, the pH is adjusted to about 5 to 7 and the resultant is allowed to react. After the reaction, the pH of the reaction liquid is adjusted to about 1 and the precipitated insoluble matter is separated by filtration to obtain the compound (intermediate) represented by general formula (f).

(e)

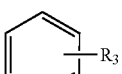

(f)

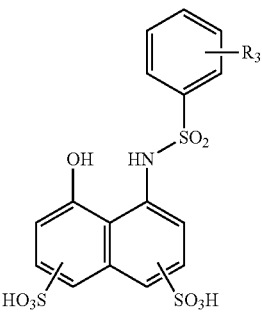

Next, the diazo compound obtained by diazotizing a compound represented by general formula (g) according to an ordinary method and the compound represented by general formula (f) obtained as described above are subjected to a coupling reaction according to an ordinary method. Thus, the compound (second coloring material) represented by general formula (2) (M in the formula represents a hydrogen atom) in a free acid form can be obtained.

(g)

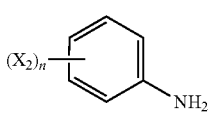

The diazotization of the compound represented by general formula (g) can be carried out by, for example, adding a diazotizing agent to the solution of the compound under the conditions at a liquid temperature of about −50 to 100° C. (preferably −10 to 10° C.) in the presence of an inorganic acid such as hydrochloric acid or sulfuric acid. The coupling reaction between the diazo compound of the compound represented by general formula (g) and the compound represented by general formula (f) can be carried out, for example, in a liquid medium at a temperature of about −50 to 100° C. (preferably −10 to 10° C.) and at a weakly acidic to alkaline pH value. Water, an organic solvent, or a mixture thereof can be used as the liquid medium. The pH value is preferably a weakly acidic to alkaline pH value. For example, the coupling reaction can be carried out at pH 5 to 10 and the pH value can be adjusted by adding a base. The compound represented by general formula (f) and the compound represented by general formula (g) may be used in approximately stoichiometric amounts.

After each synthesis of the compound represented by general formula (1) and the compound represented by general formula (2), the following treatments are carried out if necessary and thus a salt type compound represented by general formula (1) and a salt type compound represented by the general formula (2) can be obtained. A method in which a desired salt is added to the reaction system and salting out is carried out may be used. In addition, a method in which after a mineral acid such as hydrochloric acid is added to the reaction system to separate a compound in a free acid form, the obtained compound is washed, and a desired salt is added to the free acid in a liquid medium (preferably water) again to obtain a salt type compound.

(Verification Method of Coloring Material)

In order to verify whether or not the coloring material used in the present invention is contained in the ink, the following verification methods (1) to (3) using high performance liquid chromatography (HPLC) can be applied.

(1) Retention time of a peak
(2) Maximum absorption wavelength for the peak in (1)
(3) m/z (posi) and m/z (nega) of a mass spectrum for the peak in (1)

The analytical conditions for high performance liquid chromatography are as follows. A liquid (ink) diluted with pure water about 1,000-fold is used as a sample for measurement. Then, analysis by high performance liquid chromatography is carried out under the following conditions to measure the retention time of a peak and the maximum absorption wavelength for the peak.

Column: SunFire $C_{18}$ (manufactured by Nihon Waters K. K.) 2.1 mm×150 mm
Column temperature: 40° C.
Flow rate: 0.2 mL/min
PDA: 200 nm to 700 nm
Eluent and gradient conditions: Table 1

TABLE 1

| Eluent, Gradient Conditions | | | | |
| --- | --- | --- | --- | --- |
| | 0-5 min | 5-24 min | 24-31 min | 31-45 min |
| A: Water | 85% | 85→45% | 45→0% | 0% |
| B: Methanol | 10% | 10→50% | 50→95% | 95% |
| C: 0.2 mol/L aqueous ammonium acetate solution | 5% | 5% | 5% | 5% |

In addition, the mass spectrum analysis conditions are as follows. The mass spectrum of the obtained peak is measured under the following conditions and the most strongly detected m/z is measured for each of posi and nega.

Ionization method: ESI
Capillary voltage: 3.5 kV
Desolvation gas: 300° C.
Ion source temperature: 120° C.

Detectors:
posi; 40 V 200 to 1500 amu/0.9 sec
nega; 40 V 200 to 1500 amu/0.9 sec The results of the measurement by the above method under the above conditions are shown below.

Sodium salt of Compound I-1 ("Compound 1-1" below)
HPLC purity at 254 nm=98.4%
m/z=350.5 ($[M-2Na]^{2-}$), 702.1 ($[M-2Na+H]^-$)
Sodium salt of Compound II-1 ("Compound 2-1" below)
HPLC purity at 254 nm=98.9%
m/z=322.5 ($[M-2Na]^{2-}$), 644.0 ($[M-2Na+H]^-$)
Sodium salt of Compound II-5 ("Compound 2-5" below)
HPLC purity at 254 nm=97.6%
m/z=304.7 ($[M-2Na]^{2-}$), 610.1 ($[M-2Na+H]^-$)

(Content of Coloring Material)

As described above, it is required that the proportion (% by mass) of the content of the second coloring material to the total content of the first coloring material and the second coloring material in the aqueous ink is 0.60% by mass or more. In addition, the proportion (% by mass) of the content of the second coloring material to the total content of the first coloring material and the second coloring material in the aqueous ink is preferably 1.60% by mass or less from the viewpoint of the ink ejection property. This proportion is more preferably 1.50% by mass or less, and still more preferably 1.40% by mass or less. This proportion (% by mass) can be calculated from Expression: $C_2/(C_1+C_2)\times100$ (% by mass) in a case where the content of the first coloring material in the ink is expressed as $C_1$ (% by mass) and the content of the second coloring material is expressed as $C_2$ (% by mass). As described above, the water solubility of the second coloring material is higher than that of the first coloring material, but the solubility in the water-soluble organic solvent is low. In an ink jet recording apparatus, when the content of the water-soluble organic solvent is relatively increased due to evaporation of water in the ink, the dissolved state of the second coloring material easily becomes unstable. When the ejection energy is applied to the second coloring material in such a state, the material easily aggregates. Since this phenomenon occurs every time the ink is ejected, the aggregates adhere to the ink flow path of the recording head, which causes the ink ejection direction to be bent to cause twisting. In order to suppress such a situation and improve the ejection property of the ink, it is preferable that the proportion (% by mass) of the content of the second coloring material in the ink is 1.60% by mass or less.

The total content of the first coloring material and the second coloring material ($C_1+C_2$; % by mass) in the aqueous ink is preferably 2.50% by mass or more to 6.50% by mass or less and more preferably 3.00% by mass or more to 6.00% by mass or less based on the total mass of the ink. When the total content of the first coloring material and the second coloring material in the ink is 3.00% by mass or more, the optical density of the image is more easily increased. Further, when the total content of the first coloring material and the second coloring material in the ink is 6.00% by mass or less, the sticking resistance of the ink can be more easily enhanced. That is, clogging that easily occurs in a case where an ink cartridge filled with an ink is left for a long time in a state where the ink cartridge is mounted on the ink jet recording apparatus is easily recovered by performing a recovery operation such as a predetermined suction operation, and for example, the number of recovery operations is small.

The content (% by mass) of the first coloring material in the aqueous ink is preferably 0.10% by mass or more to 10.00% by mass or less and more preferably 0.50% by mass or more to 6.50% by mass or less based on the total mass of the ink. In addition, the content (% by mass) of the second coloring material in the aqueous ink is preferably 0.01% by mass or more to 5.00% by mass or less and more preferably 0.01% by mass or more to 1.00% by mass or less based on the total mass of the ink. The proportion of the total content (% by mass) of the first coloring material and the second coloring material to the total content (% by mass) of all the coloring materials in the aqueous ink is preferably 10.0% by mass or more. The proportion is more preferably 20.0% by mass or more and particularly preferably 50.0% by mass or more and may be 100.0% by mass.

(Hue of Ink)

In the present invention, the image having a preferable hue as a magenta ink specifically means the following. For a solid image recorded only with a magenta ink on a white recording medium at an ink application amount of approximately 0.06 g/inch$^2$, a* and b* are measured in the L*a*b* color system specified by International Commission on Illumination (CIE). Then, it is assumed that from the obtained values of a* and b*, an image having a hue angle (H°) of 16° or more to 26° or less, the hue angle being calculated based on Expression (A), is considered as an image having a good hue as a magenta ink. Further, an ink capable of recording an image having such a hue angle (H°) is an ink having a preferable hue as a magenta ink. From the viewpoint that the hue of the magenta ink is improved, the hue angle (H°) is more preferably 18° or more to 24° or less and still more preferably 20° or more to 22° or less. The values of a* and b* can be measured using, for example, a spectrophotometer (trade name: Spectrolino; manufactured by GretagMacbeth). Of course, the present invention is not limited to this. Examples of the "white recording medium" used in color measurement include a recording medium of which ISO whiteness (JIS P 8148) utilizing diffuse blue light reflectance is about 80% or more.

$H°=\tan^{-1}(b*/a*)$, where $a*\geq 0$ and $b*\geq 0$ (first quadrant)

$H°=180+\tan^{-1}(b*/a*)$, where $a*\leq 0$ and $b*\geq 0$ (second quadrant)

$H°=180+\tan^{-1}(b*/a*)$, where $a*\leq 0$ and $b*\leq 0$ (third quadrant)

$H°=360+\tan^{-1}(b*/a*)$, where $a*\geq 0$ and $b*\leq 0$ (fourth quadrant)                    Expression (A)

(Aqueous Medium)

The ink according to the present invention is an aqueous ink containing at least water as an aqueous medium. It is preferable to use deionized water (ion exchanged water) as the water. The content (% by mass) of water in the ink is preferably 10.00% by mass or more to 90.00% by mass or less and more preferably 50.00% by mass or more to 90.00% by mass or less based on the total mass of the ink.

The aqueous medium may further contain a water-soluble organic solvent. The water-soluble organic solvent is not particularly limited as long as the solvent is water-soluble, and monohydric alcohol, polyhydric alcohol, (poly)alkylene glycol, glycol ether, a nitrogen-containing polar solvent, a sulfur-containing polar solvent and the like can be used. As the water-soluble organic solvent, it is preferable to use one having vapor pressure lower than that of water. The content (% by mass) of the water-soluble organic solvent in the ink is preferably 3.00% by mass or more to 50.00% by mass or less based on the total mass of the ink.

(Other Additives)

The ink of the present invention may contain a water-soluble organic compound which is solid at normal temperature, such as a polyhydric alcohol such as trimethylolpropane or trimethylolethane, urea, or a urea derivative such as ethyleneurea, in addition to the above-described components if necessary. In addition, the ink of the present invention may also contain various additives such as a surfactant, a pH adjustor, a preservative, a mildewproofing agent, an antioxidant, an anti-reducing agent, an evaporation accelerator, a chelating agent and a water-soluble polymer if necessary. Among these, it is preferable that the ink contains a surfactant. The content (% by mass) of the surfactant in the aqueous ink is preferably 0.05% by mass or more to 1.50% by mass or less and more preferably 0.10% by mass or more to 1.20% by mass or less based on the total mass of the ink.

<Ink Cartridge>

The ink cartridge according to the present invention includes an ink and an ink storage portion that stores the ink. The ink stored in the ink storage portion is the aqueous ink according to the present invention described above. FIG. 1 is a sectional view schematically illustrating an exemplary embodiment of the ink cartridge according to the present invention. As illustrated in FIG. 1, an ink supply port 12 for supplying an ink to a recording head is provided on the bottom surface of the ink cartridge. The inside of the ink cartridge is an ink storage portion that stores the ink. The ink storage portion is made up by an ink storage chamber 14 and an absorber storage chamber 16, and these chambers communicate with each other through a communication port 18. In addition, the absorber storage chamber 16 communicates with the ink supply port 12. A liquid ink 20 is stored in the ink storage chamber 14, and the absorbers 22 and 24 that hold the ink in an impregnated state are stored in the absorber storage chamber 16. The ink storage portion may be configured such that the whole amount of the ink stored is held by the absorber without providing the ink storage chamber that stores a liquid ink. In addition, the ink storage portion may also be configured such that the whole amount of the ink is stored in a liquid state without having the absorber. Further, the ink cartridge may also be configured so as to have an ink storage portion and a recording head.

<Ink Jet Recording Method>

The ink jet recording method according to the present invention is a method of ejecting the above-described aqueous ink according to the present invention from an ink jet recording head to record an image on a recording medium. Systems for ejecting the ink include a system in which mechanical energy is applied to the ink and a system in which thermal energy is applied to the ink. In the present invention, the system in which the thermal energy is applied to the ink to eject the ink is particularly preferably adopted. Steps of the ink jet recording method may be those well known except that the ink according to the present invention is used.

Figure 2A:
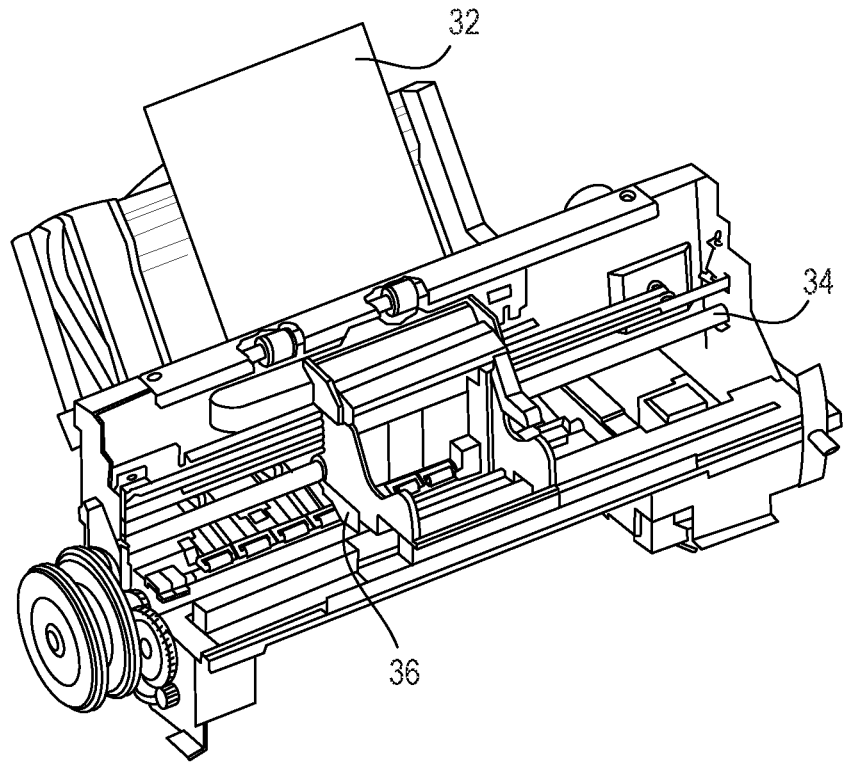
FIG. 2A is a perspective view of an example of a main part of an ink jet recording apparatus used in an ink jet recording method according to the present invention.
Figure 2B:
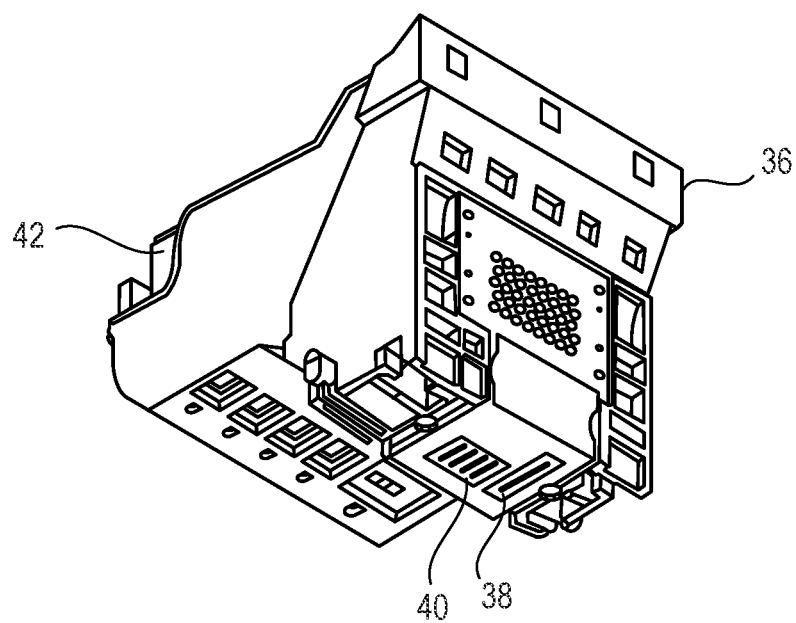
FIG. 2B is a perspective view of an example of a head cartridge of the ink jet recording apparatus used in the ink jet recording method according to the present invention.

FIGS. 2A and 2B are schematic views illustrating an example of an ink jet recording apparatus used in the ink jet recording method according to the present invention. FIG. 2A is a perspective view of a main part of the ink jet recording apparatus and FIG. 2B is a perspective view of a head cartridge. In the ink jet recording apparatus, a conveyance unit (not illustrated) that conveys a recording medium 32 and a carriage shaft 34 are provided. A head cartridge 36 can be mounted on the carriage shaft 34. The head cartridge 36 is provided with recording heads 38 and 40 and is configured such that an ink cartridge 42 is set therein. Inks (not illustrated) are ejected toward the recording medium 32 from the recording heads 38 and 40 while the head cartridge 36 is being carried in a main scanning direction along the carriage shaft 34. Then, the recording medium 32 is conveyed in a sub scanning direction by the conveyance unit (not illustrated) and an image is recorded on the recording medium 32. The recording medium 32 is not particularly limited and it is preferable to use a recording medium using paper, such as a recording medium having no coat layer such as plain paper and a recording medium having a coat layer such as glossy paper or matte paper, as a base material.

EXAMPLES

Hereinafter, the present invention will be described in more detail with reference to Examples and Comparative Examples. However, the present invention is not limited to the following examples unless going beyond the gist of the present invention. All designations of "part" or "parts" and "%" as to amounts of components described below are based on mass unless otherwise specified.

<Synthesis of Coloring Material>

(Compound 1-1)

In a 300 mL three-necked flask, 30 g of 8-amino-1-hydroxynaphthalene-3,6-disulfonic acid (refer to formula (a1)) and 30 mL of pure water were placed, and the mixture was heated and stirred at 75° C. A 25% aqueous sodium hydroxide solution was added to this solution to adjust the pH to 3. While maintaining the pH of the solution at 3 using the 25% aqueous sodium hydroxide solution, 15 g of p-toluenesulfonyl chloride (refer to formula (b1)) was slowly added. After the addition, the mixture was stirred at 75° C. for 1 hour and then the 25% aqueous sodium hydroxide solution was added to adjust the pH to 6. After the reaction, concentrated hydrochloric acid was added to adjust the pH of the solution to 1, the precipitated deposit was separated by filtration and the filtrate was concentrated by evaporation under reduced pressure. Thereafter, methanol was added thereto and the precipitated insoluble matter was separated by filtration. Methanol was evaporated under reduced pressure and desalting was carried out to obtain a compound (intermediate) represented by formula (c1).

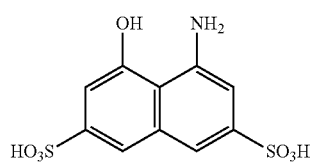

(a1)

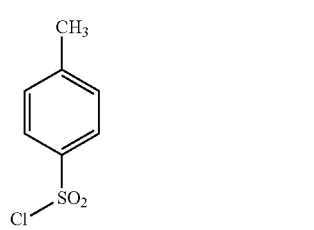

(b1)

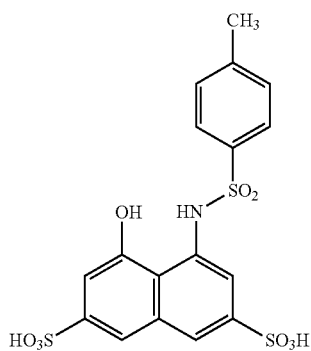

(c1)

In a 100 mL conical flask, 5 g of 3-chloro-6-phenoxyaniline (refer to formula (d1)) was placed and dissolved in 10 mL of concentrated hydrochloric acid and 50 mL of methanol. The conical flask containing the solution was placed in an ice bath and cooled to a liquid temperature of 0 to 5° C. 2 g of sodium nitrite was dissolved in 5 mL of pure water, rapidly added dropwise to the conical flask and stirred at the same temperature for 30 minutes. Next, 0.3 g of sulfamic acid was added. Thus, a diazotized liquid was prepared.

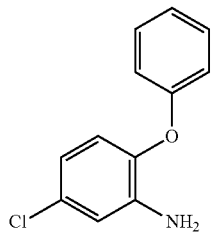

(d1)

Into a 300 mL three-necked flask, 10 g of the compound (intermediate) represented by formula (c1) obtained above, 10 g of sodium carbonate and 100 mL of pure water were placed and dissolved by stirring. The three-necked flask containing the solution was placed in an ice bath and cooled to a liquid temperature of 0 to 5° C. and the diazotized liquid was added dropwise while maintaining the state in which the temperature was 0 to 5° C. and the pH was 8 or higher. After stirring overnight, salting out and desalting were carried out according to an ordinary method to synthesize a sodium salt of Compound I-1 represented by formula (I-1) (referred to as "Compound 1-1") (yield: 85%). Then, pure water was added to obtain an aqueous solution containing Compound 1-1 (dye) at a content of 10.0%.

(Compound 1-2)

The reaction was carried out under the same conditions except that 3-chloro-6-phenoxyaniline (refer to formula (d1)) in the synthesis of Compound 1-1 was changed to 4-chloro-2-phenoxyaniline. In this manner, a sodium salt of Compound 1-2 represented by formula (I-2) (referred to as "Compound 1-2") was synthesized (yield: 84%). Then, pure water was added to obtain an aqueous solution containing Compound 1-2 (dye) at a content of 10.0%.

(Compound 1-3)

In the synthesis of Compound 1-1, 3-chloro-6-phenoxyaniline (refer to formula (d1)) was changed to 3-chloro-6-(p-methyl)phenoxyaniline and the reaction was carried out. After the reaction, the pH was lowered to less than 1 with hydrochloric acid, the solid was separated by filtration and placed in a 200 mL conical flask. A 25% aqueous potassium hydroxide solution was added thereto to adjust the pH of the solution to 8, and then salting out and desalting were carried out. In this manner, the potassium salt of Compound 1-3 represented by formula (I-3) (referred to as "Compound 1-3") was synthesized (yield: 75%). Then, pure water was added to obtain an aqueous solution containing Compound 1-3 (dye) at a content of 10.0%.

(Compound 1-4)

In the synthesis of Compound 1-1, 3-chloro-6-phenoxyaniline (refer to formula (d1)) was changed to 3-chloro-6-(p-methoxy)phenoxyaniline and the reaction was carried out. After the reaction, the pH was lowered to less than 1 with hydrochloric acid, a 25% aqueous potassium hydroxide solution was added to adjust the pH of the solution to 8, and then salting out and desalting were carried out. In this manner, a potassium salt of Compound 1-4 represented by formula (I-4) (referred to as "Compound 1-4") was synthesized (yield: 76%). Then, pure water was added to obtain an aqueous solution containing Compound 1-4 (dye) at a content of 10.0%.

(Compound 1-5)

In the synthesis of Compound 1-1, a series of reactions was carried out under the same conditions except that p-toluenesulfonyl chloride (refer to formula (b1)) used in the synthesis of the above intermediate was changed to benzenesulfonic acid chloride. In this manner, a sodium salt of Compound I-5 represented by formula (I-5) (referred to as "Compound 1-5") was synthesized (yield: 80%). Then, pure water was added to obtain an aqueous solution containing Compound 1-5 (dye) at a content of 10.0%.

(Compound 1-6)

In the synthesis of Compound 1-1, p-toluenesulfonyl chloride (refer to formula (b1)) used in the synthesis of the above intermediate was changed to p-methoxy-benzene-sulfonic acid chloride, and a series of reactions was carried out. After the reaction, the pH was lowered to less than 1 with hydrochloric acid, a 25% aqueous ammonia solution was added to adjust the pH of the solution to 8, and then salting out and desalting were carried out. In this manner, an ammonium salt of Compound 1-6 represented by formula (I-6) (referred to as "Compound 1-6") was synthesized (yield: 77%). Then, pure water was added to obtain an aqueous solution containing Compound 1-6 (dye) at a content of 10.0%.

(Compound 2-1)

The reaction was carried out under the same conditions except that 3-chloro-6-phenoxyaniline (refer to formula (d1)) in the synthesis of Compound 1-1 was changed to 2,5-dichloroaniline (refer to formula (g1)). In this manner, a sodium salt of Compound II-1 represented by formula (II-1) (referred to as "Compound 2-1") was synthesized (yield: 85%). Then, pure water was added to obtain an aqueous solution containing Compound 2-1 (dye) at a content of 10.0%.

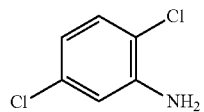

(g1)

(Compound 2-2)

The reaction was performed under the same conditions except that 2,5-dichloroaniline (refer to formula (g1)) in the synthesis of Compound 2-1 was changed to 2,4-dichloroaniline. In this manner, a sodium salt of Compound II-2 represented by formula (II-2) (referred to as "Compound 2-2") was synthesized (yield: 80%). Then, pure water was added to obtain an aqueous solution containing Compound 2-2 (dye) at a content of 10.0%.

(Compound 2-3)

In the synthesis of Compound 2-1, p-toluenesulfonyl chloride (refer to formula (b1)) used in the synthesis of the above intermediate was changed to benzenesulfonic acid chloride and a series of reactions was carried out. After the reaction, the pH was lowered to less than 1 with hydrochloric acid, the solid was separated by filtration and placed in a 200 mL conical flask. A 25% aqueous potassium hydroxide solution was added thereto to adjust the pH of the solution to 8, and then salting out and desalting were carried out. In this manner, a potassium salt of Compound II-3 represented by formula (II-3) (referred to as "Compound 2-3") was synthesized (yield: 79%). Then, pure water was added to obtain an aqueous solution containing Compound 2-3 (dye) at a content of 10.0%.

(Compound 2-4)

In the synthesis of Compound 2-1, p-toluenesulfonyl chloride (refer to formula (b1)) used in the synthesis of the above intermediate was changed to p-methoxy-benzene-sulfonic acid chloride and a series of reactions was carried out. After the reaction, the pH was lowered to less than 1 with hydrochloric acid, the solid was separated by filtration and placed in a 200 mL conical flask. A 25% aqueous ammonia solution was added to adjust the pH of the solution to 8, and then salting out and desalting were carried out. In this manner, an ammonium salt of Compound II-4 represented by formula (II-4) (referred to as "Compound 2-4") was synthesized (yield: 84%). Then, pure water was added to obtain an aqueous solution containing Compound 2-4 (dye) at a content of 10.0%.

(Compound 2-5)

The reaction was performed under the same conditions except that 2,5-dichloroaniline (refer to formula (g1)) in the synthesis of Compound 2-1 was changed to 3-chloroaniline. In this manner, a sodium salt of Compound II-5 represented by formula (II-5) (referred to as "Compound 2-5") was synthesized (yield: 89%). Then, pure water was added to obtain an aqueous solution containing Compound 2-5 (dye) at a content of 10.0%.

(Compound 2-6)

The reaction was carried out under the same conditions except that 2,5-dichloroaniline (refer to formula (g1)) in the synthesis of Compound 2-1 was changed to 2-chloroaniline. In this manner, a sodium salt of Compound II-6 represented by formula (II-6) (referred to as "Compound 2-6") was synthesized (yield: 83%). Then, pure water was added to obtain an aqueous solution containing Compound 2-6 (dye) at a content of 10.0%.

(Comparative Compound 1)

With reference to the description in Example 4 of Pamphlet of International Publication No. WO2004/104108, a compound represented by formula (III-1) ("Compound represented by formula (13)" described in International Publication No. WO2004/104108) was obtained. Then, an aqueous solution containing Comparative Compound 1 (dye) at a content of 10.0% was prepared using pure water.

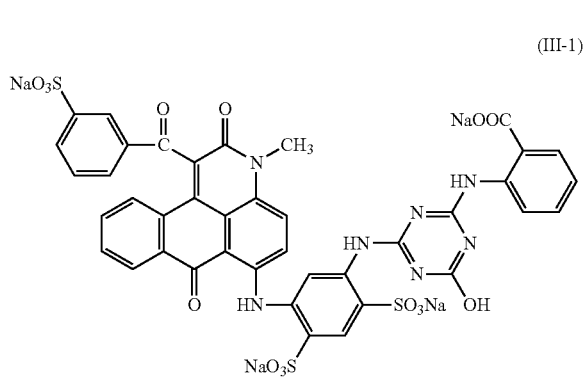

(III-1)

(Comparative Compound 2)

As Comparative Compound 2, commercially available C.I. Acid Red 289 (refer to formula (III-2)) was used. Then, an aqueous solution in which the content of Comparative Compound 2 (C.I. Acid Red 289) was 10.0% was prepared.

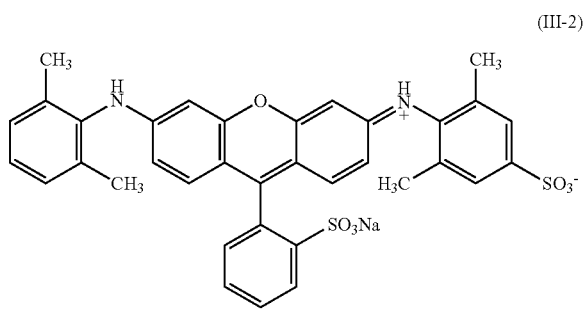

(III-2)

(Comparative Compound 3)

As Comparative Compound 3, with reference to the description of Example 1 in Japanese Patent Application Laid-Open No. 2006-143989, a compound represented by formula (III-3) ("Compound (d-5)" described in Japanese Patent Application Laid-Open No. 2006-143989) was obtained. "Et" in formula (III-3) represents an ethyl group. Then, an aqueous solution containing Comparative Compound 3 (dye) at a content of 10.0% was prepared using pure water.

(III-3)

<Preparation of Ink>

The respective components (unit: %) shown in the upper part of Table 2 (Table 2-1 and Table 2-2) were mixed, sufficiently stirred and then filtered under pressure with a filter having a pore size of 0.20 μm to prepare each ink. "ACETYLENOL E100" (manufactured by Kawaken Fine Chemicals Co., Ltd.) in Table 2 is a trade name of a nonionic surfactant. In the lower part of Table 2, the content $C_1$ (%) of the first coloring material (the compound represented by general formula (1)) and the content $C_2$ (%) of the second coloring material (the compound represented by general formula (2)) in the ink, the total content (%) of the coloring materials and the value (%) of $C_2/(C_1+C_2) \times 100$ are shown.

TABLE 2

| | Compositions and Properties of Ink | | | | | | | | | | | | | | |
|---|---|---|---|---|---|---|---|---|---|---|---|---|---|---|---|
| | Example | | | | | | | | | | | | | | |
| | 1 | 2 | 3 | 4 | 5 | 6 | 7 | 8 | 9 | 10 | 11 | 12 | 13 | 14 | 15 |
| Aqueous solution of Compound 1-1 | 49.50 | 49.70 | 28.70 | 29.70 | 59.40 | 60.40 | | | | | | 49.50 | 49.50 | 49.50 | 49.50 |
| Aqueous solution of Compound 1-2 | | | | | | | 49.50 | | | | | | | | |
| Aqueous solution of Compound 1-3 | | | | | | | | 49.50 | | | | | | | |
| Aqueous solution of Compound 1-4 | | | | | | | | | 49.50 | | | | | | |
| Aqueous solution of Compound 1-5 | | | | | | | | | | 49.50 | | | | | |
| Aqueous solution of Compound 1-6 | | | | | | | | | | | 49.50 | | | | |
| Aqueous solution of Compound 2-1 | 0.50 | 0.30 | 0.30 | 0.30 | 0.60 | 0.60 | 0.50 | 0.50 | 0.50 | 0.50 | 0.50 | | | | |
| Aqueous solution of Compound 2-2 | | | | | | | | | | | | 0.50 | | | |

TABLE 2-continued

| Compositions and Properties of Ink | | | | | | | | | | | | | | | |
|---|---|---|---|---|---|---|---|---|---|---|---|---|---|---|---|
| Aqueous solution of Compound 2-3 | | | | | | | | | | | | | 0.50 | | |
| Aqueous solution of Compound 2-4 | | | | | | | | | | | | | | 0.50 | |
| Aqueous solution of Compound 2-5 | | | | | | | | | | | | | | | 0.50 |
| Aqueous solution of Compound 2-6 | | | | | | | | | | | | | | | |
| Aqueous solution of Comparative Compound 1 | | | | | | | | | | | | | | | |
| Aqueous solution of Comparative Compound 2 | | | | | | | | | | | | | | | |
| Aqueous solution of Comparative Compound 3 | | | | | | | | | | | | | | | |
| Glycerol | 10.00 | 10.00 | 10.00 | 10.00 | 10.00 | 10.00 | 10.00 | 10.00 | 10.00 | 10.00 | 10.00 | 10.00 | 10.00 | 10.00 | 10.00 |
| Diethylene glycol | 10.00 | 10.00 | 10.00 | 10.00 | 10.00 | 10.00 | 10.00 | 10.00 | 10.00 | 10.00 | 10.00 | 10.00 | 10.00 | 10.00 | 10.00 |
| Acetylenol E100 | 0.10 | 0.10 | 0.10 | 0.10 | 0.10 | 0.10 | 0.10 | 0.10 | 0.10 | 0.10 | 0.10 | 0.10 | 0.10 | 0.10 | 0.10 |
| Pure water | 29.90 | 29.90 | 50.90 | 49.90 | 19.90 | 18.90 | 29.90 | 29.90 | 29.90 | 29.90 | 29.90 | 29.90 | 29.90 | 29.90 | 29.90 |
| Content $C_1$ of first coloring material (%) | 4.95 | 4.97 | 2.87 | 2.97 | 5.94 | 6.04 | 4.95 | 4.95 | 4.95 | 4.95 | 4.95 | 4.95 | 4.95 | 4.95 | 4.95 |
| Content $C_2$ of second coloring material (%) | 0.05 | 0.03 | 0.03 | 0.03 | 0.06 | 0.06 | 0.05 | 0.05 | 0.05 | 0.05 | 0.05 | 0.05 | 0.05 | 0.05 | 0.05 |
| Total content of coloring materials (%) | 5.00 | 5.00 | 2.90 | 3.00 | 6.00 | 6.10 | 5.00 | 5.00 | 5.00 | 5.00 | 5.00 | 5.00 | 5.00 | 5.00 | 5.00 |
| Value of $C_2/(C_1 + C_2) \times 100$ (%) | 1.00 | 0.60 | 1.03 | 1.00 | 1.00 | 0.98 | 1.00 | 1.00 | 1.00 | 1.00 | 1.00 | 1.00 | 1.00 | 1.00 | 1.00 |

| | Example | | | | | | | Comparative Example | | | | | | Reference Example | |
|---|---|---|---|---|---|---|---|---|---|---|---|---|---|---|---|
| | 16 | 17 | 18 | 19 | 20 | 21 | 22 | 1 | 2 | 3 | 4 | 5 | 6 | 1 | 2 |
| Aqueous solution of Compound 1-1 | 49.50 | | | | 49.30 | 49.20 | | 49.80 | 50.00 | | | | | 49.30 | 49.20 |
| Aqueous solution of Compound 1-2 | | 49.50 | | | | | | | | | | | | | |
| Aqueous solution of Compound 1-3 | | | 49.50 | | | | | | | | | | | | |
| Aqueous solution of Compound 1-4 | | | | 49.50 | | | 60.00 | | | | | | | | |
| Aqueous solution of Compound 1-5 | | | | | | | | | | | | | | | |
| Aqueous solution of Compound 1-6 | | | | | | | | | | | | | | | |
| Aqueous solution of Compound 2-1 | | | | | 0.70 | 0.80 | | 0.20 | | 50.00 | 0.50 | 0.50 | 0.50 | 0.70 | 0.80 |
| Aqueous solution of Compound 2-2 | | 0.50 | | | | | | | | | | | | | |
| Aqueous solution of Compound 2-3 | | | 0.50 | | | | | | | | | | | | |

TABLE 2-continued

Compositions and Properties of Ink

| | | | | | | | | | | | | | | | |
|---|---|---|---|---|---|---|---|---|---|---|---|---|---|---|---|
| Aqueous solution of Compound 2-4 | | | | 0.50 | 1.00 | | | | | | | | | | |
| Aqueous solution of Compound 2-5 | | | | | | | | | | | | | | | |
| Aqueous solution of Compound 2-6 | 0.50 | | | | | | | | | | | | | | |
| Aqueous solution of Comparative Compound 1 | | | | | | | | | | 49.50 | | | | | |
| Aqueous solution of Comparative Compound 2 | | | | | | | | | | | 49.50 | | | | |
| Aqueous solution of Comparative Compound 3 | | | | | | | | | | | | 49.50 | | | |
| Glycerol | 10.00 | 10.00 | 10.00 | 10.00 | 10.00 | 10.00 | 10.00 | 10.00 | 10.00 | 10.00 | 10.00 | 10.00 | 10.00 | 10.00 | 10.00 |
| Diethylene glycol | 10.00 | 10.00 | 10.00 | 10.00 | 10.00 | 10.00 | 10.00 | 10.00 | 10.00 | 10.00 | 10.00 | 10.00 | 10.00 | 10.00 | 10.00 |
| Acetylenol E100 | 0.10 | 0.10 | 0.10 | 0.10 | 0.10 | 0.10 | 0.10 | 0.10 | 0.10 | 0.10 | 0.10 | 0.10 | 0.10 | 0.10 | 0.10 |
| Pure water | 29.90 | 29.90 | 29.90 | 29.90 | 29.90 | 29.90 | 18.90 | 29.90 | 29.90 | 29.90 | 29.90 | 29.90 | 29.90 | 29.90 | 29.90 |
| Content $C_1$ of first coloring material (%) | 4.95 | 4.95 | 4.95 | 4.95 | 4.93 | 4.92 | 6.00 | 4.98 | 5.00 | 0.00 | 0.00 | 0.00 | 0.00 | 4.93 | 4.92 |
| Content $C_2$ of second coloring material (%) | 0.05 | 0.05 | 0.05 | 0.05 | 0.07 | 0.08 | 0.10 | 0.02 | 0.00 | 5.00 | 0.05 | 0.05 | 0.05 | 0.07 | 0.08 |
| Total content of coloring materials (%) | 5.00 | 5.00 | 5.00 | 5.00 | 5.00 | 5.00 | 6.10 | 5.00 | 5.00 | 5.00 | 5.00 | 5.00 | 5.00 | 5.00 | 5.00 |
| Value of $C_2/(C_1 + C_2) \times 100$ (%) | 1.00 | 1.00 | 1.00 | 1.00 | 1.40 | 1.60 | 1.64 | 0.40 | 0.00 | 100.00 | 100.00 | 100.00 | 100.00 | 1.40 | 1.60 |

<Evaluation>

Each of the inks obtained above was filled into an ink cartridge and the ink cartridge was mounted on an ink jet recording apparatus (trade name "PIXUS iP8600", manufactured by Canon Inc.) in which an ink is ejected from a recording head by the action of thermal energy. In this example, a solid image recorded by applying 2.6 ng of 8 ink droplets to a unit region of 1/2400 inch×1/1200 inch is defined as "recording duty of 100%". However, in Reference Examples 1 and 2, the evaluation was carried out in the same manner except that the recording head that ejects ink by the action of mechanical energy using a piezo element was used without changing the resolution condition was changed. In the present invention, "AA", "A" and "B" were defined as acceptable levels and "C" was defined as an unacceptable level based on the evaluation criteria of the following respective items. The evaluation results are shown in Table 3.

(Hue)

Images with recording duty changed from 0% to 100% in an increment of 10% were recorded on glossy paper (trade name "CANON PHOTOGRAPHIC PAPER GLOSSY PRO [Platinum Grade] PT201", manufactured by CANON Inc.) as a recording medium under the conditions of a temperature of 23° C. and a relative humidity of 55%. This image was naturally dried at a temperature of 23° C. and a relative humidity of 55% for 24 hours to obtain a recorded matter. The a* and b* in the L*a*b* color system defined by International Commission on Illumination (CIE) were measured for the image portion of the obtained recorded matter having a recording duty of 100%. The values of a* and b* were measured using a spectrophotometer (trade name "Spectrolino", manufactured by Gretag Macbeth) under the conditions of a light source of D50 and a visual field of 2°. From the obtained values of a* and b*, the hue angle (H°) was calculated based on Expression (A).

$H° = \tan^{-1}(b^*/a^*)$, where $a^* \geq 0$ and $b^* \geq 0$ (first quadrant)

$H° = 180 + \tan^{-1}(b^*/a^*)$, where $a^* \leq 0$ and $b^* \geq 0$ (second quadrant)

$H° = 180 + \tan^{-1}(b^*/a^*)$, where $a^* \leq 0$ and $b^* \leq 0$ (third quadrant)

$H° = 360 + \tan^{-1}(b^*/a^*)$, where $a^* \geq 0$ and $b^* \leq 0$ (fourth quadrant)     Expression (A)

From the obtained values of H°, the hue of the image was evaluated according to the following evaluation criteria.

AA: H° was 20° or more and 22° or less.
A: H° was 18° or more and less than 20° or more than 22° and 24° or less.
B: H° was 16° or more and less than 18° or more than 24° and 26° or less.
C: H° was less than 16° or more than 26°.

(Ejection Property)

Each of the inks obtained above was charged into a cartridge and the cartridge was mounted on an ink jet recording apparatus. After a nozzle check pattern of PIXUS iP8600 was recorded, 5000 solid images of 20 cm×29 cm with a recording duty of 100% were recorded, and the nozzle check pattern was recorded again. The ejection state was checked by comparing the nozzle check patterns before and after recording 5000 sheets. Ejection property was evaluated according to the following evaluation criteria.

AA: The nozzle check pattern was normally recorded.
A: The nozzle check pattern was slightly twisted but the ruled line was continuous.
B: The nozzle check pattern was slightly twisted and a part of the ruled line was missing.
C: The nozzle check pattern was significantly disturbed and there was ejection failure.

TABLE 3

| | | Hue | Ejection property |
|---|---|---|---|
| Example | 1 | AA | AA |
| | 2 | AA | AA |
| | 3 | A | AA |
| | 4 | AA | AA |
| | 5 | AA | AA |
| | 6 | AA | A |
| | 7 | A | AA |
| | 8 | A | AA |
| | 9 | A | AA |
| | 10 | A | A |
| | 11 | A | A |
| | 12 | A | AA |
| | 13 | A | A |
| | 14 | A | A |
| | 15 | AA | AA |
| | 16 | A | AA |
| | 17 | B | AA |
| | 18 | B | A |
| | 19 | B | A |
| | 20 | AA | AA |
| | 21 | AA | A |
| | 22 | B | B |
| Comparative Example | 1 | C | AA |
| | 2 | C | A |
| | 3 | C | B |
| | 4 | C | B |
| | 5 | C | B |
| | 6 | C | B |
| Reference Example | 1 | AA | AA |
| | 2 | AA | AA |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-204528, filed Nov. 12, 2019, and Japanese Patent Application No. 2020-168316, filed Oct. 5, 2020, which are hereby incorporated by reference herein in their entirety.

What is claimed is:

1. An aqueous ink for ink jet comprising a first coloring material and a second coloring material,
wherein the first coloring material is a compound represented by general formula (1),
wherein the second coloring material is a compound represented by general formula (2),
wherein a proportion (% by mass) of a content of the second coloring material to a total content of the first coloring material and the second coloring material in the aqueous ink is 0.60% by mass or more to 1.40% by mass or less, and
wherein the total content (% by mass) of the first coloring material and the second coloring material in the aqueous ink is 3.00% by mass or more to 6.00% by mass or less based on a total mass of the ink,

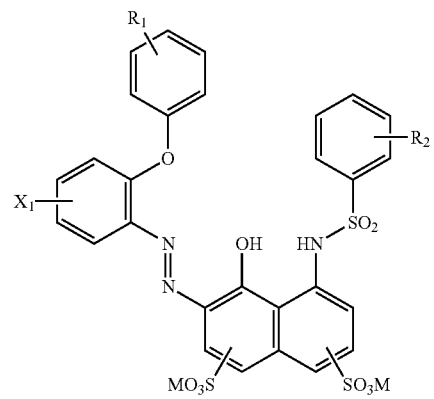

in general formula (1), $R_1$ and $R_2$ each independently represent a hydrogen atom, an alkyl group, or an alkoxy group, $X_1$ represents a halogen atom, and M's each independently represent a hydrogen atom, an alkali metal, ammonium or organic ammonium, and

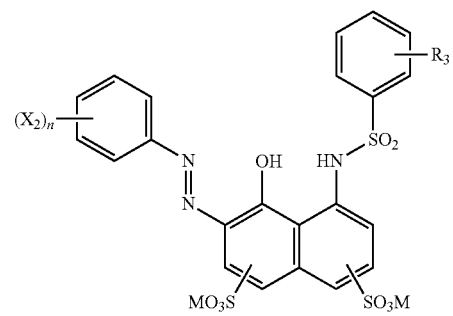

in general formula (2), $R_3$ represents an alkoxy group, an ethyl group, an n-propyl group, an n-butyl group, or a branched alkyl group, $X_2$'s each independently represent a halogen atom, n represents an integer of 1 or 2, and M's each independently represent a hydrogen atom, an alkali metal, ammonium or organic ammonium.

2. An ink cartridge comprising an ink and an ink storage portion that stores the ink,
wherein the ink is the aqueous ink according to claim 1.

3. An ink jet recording method comprising ejecting an ink from an ink jet recording head to record an image on a recording medium,
wherein the ink is the aqueous ink according to claim 1.

4. The aqueous ink according to claim 1, wherein the content (% by mass) of the first coloring material in the aqueous ink is 0.10% by mass or more to 5.00% by mass or less based on a total mass of the ink.

5. The aqueous ink according to claim 1, wherein the content (% by mass) of the second coloring material in the aqueous ink is 0.01% by mass or more to 5.00% by mass or less based on the total mass of the ink.

6. The aqueous ink according to claim 1, wherein the proportion of the total content (% by mass) of the first coloring material and the second coloring material to the total content (% by mass) of all coloring materials in the aqueous ink is 10.0% by mass or more to 100.0% by mass or less.

7. An aqueous ink for ink jet comprising a first coloring material and a second coloring material,
    wherein the first coloring material is a compound represented by general formula (1),
    wherein the second coloring material is a compound represented by general formula (2),
    wherein a proportion (% by mass) of a content of the second coloring material to a total content of the first coloring material and the second coloring material in the aqueous ink is 0.60% by mass or more to 1.40% by mass or less, and
    wherein the total content (% by mass) of the first coloring material and the second coloring material in the aqueous ink is 3.00% by mass or more to 6.00% by mass or less based on a total mass of the ink,

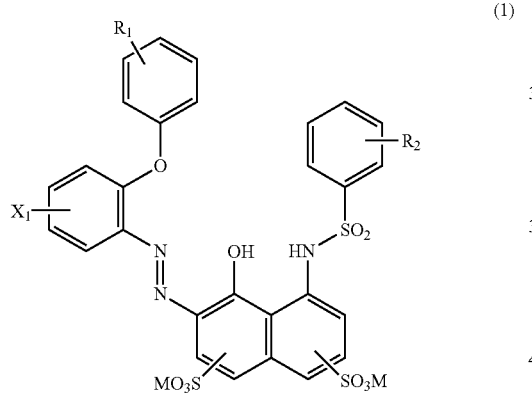

(1)

in general formula (1), $R_1$ represents an alkyl group or an alkoxy group, $R_2$ represents a hydrogen atom, an alkyl group, or an alkoxy group, $X_1$ represents a halogen atom, and M's each independently represent a hydrogen atom, an alkali metal, ammonium or organic ammonium, and

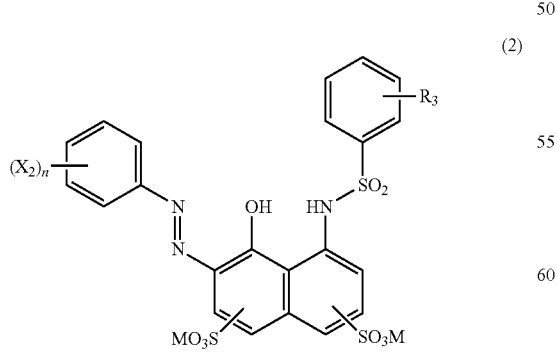

(2)

in general formula (2), $R_3$ represents a hydrogen atom, an alkyl group or an alkoxy group, $X_2$'s each independently represent a halogen atom, n represents an integer of 1 or 2, and M's each independently represent a hydrogen atom, an alkali metal, ammonium or organic ammonium.

8. The aqueous ink according to claim 7, wherein the proportion of the total content (% by mass) of the first coloring material and the second coloring material to the total content (% by mass) of all coloring materials in the aqueous ink is 10.0% by mass or more to 100.0% by mass or less.

9. An aqueous ink for ink jet comprising a first coloring material and a second coloring material,
    wherein the first coloring material is a compound represented by general formula (1),
    wherein the second coloring material is a compound represented by general formula (2),
    wherein a proportion (% by mass) of a content of the second coloring material to a total content of the first coloring material and the second coloring material in the aqueous ink is 0.60% by mass or more to 1.40% by mass or less, and
    wherein the total content (% by mass) of the first coloring material and the second coloring material in the aqueous ink is 3.00% by mass or more to 6.00% by mass or less based on a total mass of the ink,

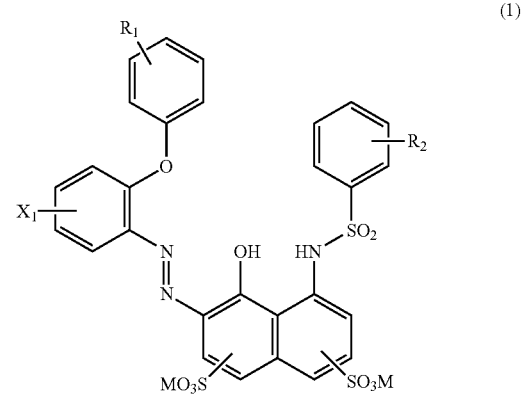

(1)

in general formula (1), $R_1$ represents a hydrogen atom, an alkyl group, or an alkoxy group, $R_2$ represents a hydrogen atom, an alkoxy group, an ethyl group, an n-propyl group, an n-butyl group, or a branched alkyl group, $X_1$ represents a halogen atom, and M's each independently represent a hydrogen atom, an alkali metal, ammonium or organic ammonium, and

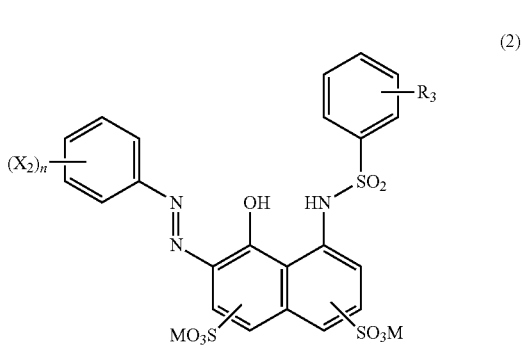

(2)

in general formula (2), Ra represents a hydrogen atom, an alkyl group or an alkoxy group, $X_2$'s each independently represent a halogen atom, n represents an integer of 1 or 2, and M's each independently represent a hydrogen atom, an alkali metal, ammonium or organic ammonium.

10. The aqueous ink according to claim 9, wherein a content (% by mass) of the first coloring material in the aqueous ink is 0.10% by mass or more to 5.00% by mass or less based on a total mass of the ink.

11. The aqueous ink according to claim 9, wherein the content (% by mass) of the second coloring material in the aqueous ink is 0.01% by mass or more to 5.00% by mass or less based on the total mass of the ink.

12. The aqueous ink according to claim 9, wherein the proportion of the total content (% by mass) of the first coloring material and the second coloring material to the total content (% by mass) of all coloring materials in the aqueous ink is 10.0% by mass or more to 100.0% by mass or less.

13. The aqueous ink according to claim 9, wherein the first coloring material is a sodium salt type.

14. The aqueous ink according to claim 9, wherein the second coloring material is a sodium salt type.

15. The aqueous ink according to claim 9, wherein the content (% by mass) of the second coloring material in the aqueous ink is 0.01% by mass or more to 1.00% by mass or less based on the total mass of the ink.

16. The aqueous ink according to claim 9, wherein the proportion of the total content (% by mass) of the first coloring material and the second coloring material to the total content (% by mass) of all coloring materials in the aqueous ink is 20.0% by mass or more to 100.0% by mass or less.

17. The aqueous ink according to claim 9, wherein the proportion of the total content (% by mass) of the first coloring material and the second coloring material to the total content (% by mass) of all coloring materials in the aqueous ink is 50.0% by mass or more to 100.0% by mass or less.

18. An ink cartridge comprising an ink and an ink storage portion that stores the ink,
wherein the ink is the aqueous ink according to claim 9.

19. An ink jet recording method comprising ejecting an ink from an ink jet recording head to record an image on a recording medium,
wherein the ink is the aqueous ink according to claim 9.

20. An ink cartridge comprising an ink and an ink storage portion that stores the ink,
wherein the ink is the aqueous ink according to claim 7.

21. An ink jet recording method comprising ejecting an ink from an ink jet recording head to record an image on a recording medium,
wherein the ink is the aqueous ink according to claim 7.

* * * * *